United States Patent [19]

Campiche

[11] 4,406,524

[45] Sep. 27, 1983

[54] AFOCAL OPTICAL DEVICE

[76] Inventor: Eric Campiche, 8, Chemin des Villas, 1093 La Conversion, Vaud, Switzerland

[21] Appl. No.: 175,682

[22] Filed: Aug. 5, 1980

[30] Foreign Application Priority Data

Aug. 14, 1979 [CH] Switzerland ................. 7421/79

[51] Int. Cl.³ ..................... G02B 3/00; G02B 15/02
[52] U.S. Cl. ..................... 350/453; 350/422
[58] Field of Search ............... 350/453, 422, 38, 520

[56] References Cited

U.S. PATENT DOCUMENTS

| 3,152,209 | 10/1964 | Cox et al. | 350/453 |
| 3,319,553 | 5/1967 | Vogel | 350/422 |
| 4,251,127 | 2/1981 | Yamaguchi | 350/453 X |

FOREIGN PATENT DOCUMENTS

| 1053810 | 3/1959 | Fed. Rep. of Germany . |
| 2527105 | 2/1976 | Fed. Rep. of Germany . |
| 1033010 | 7/1953 | France . |
| 1130523 | 2/1957 | France | 350/479 |
| 2136852 | 12/1972 | France . |

OTHER PUBLICATIONS

SMPTE Journal, vol. 88, Apr. 1979, "The Bolex Aspheron: A Super-Wide-Angle Adapter", by J. Vasata, pp. 236 & 237.
"In-Water Photography-Theory and Practice", by Lawrence E. Mertens, pp. 154–158.

*Primary Examiner*—John K. Corbin
*Assistant Examiner*—Scott J. Sugarman
*Attorney, Agent, or Firm*—Young & Thompson

[57] ABSTRACT

The afocal optical device is a removable accessory intended to be placed on an objective for taking pictures in the air as well as in water in order to reduce the focal length without modification of the focussing. In a preferred embodiment it comprises a frontal diverging group (G1) having two diverging lenses (A, B), and a positive rear group (G2) formed of two converging lenses (C, D).

4 Claims, 2 Drawing Figures

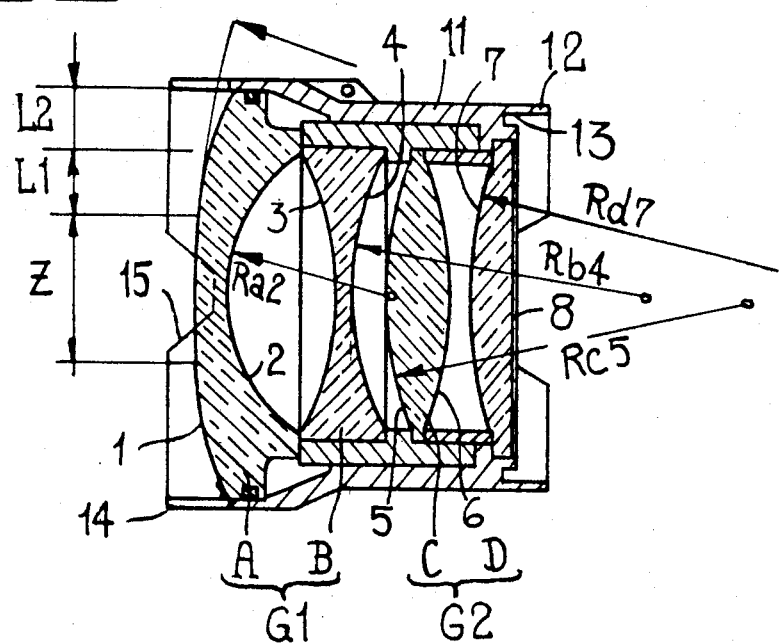
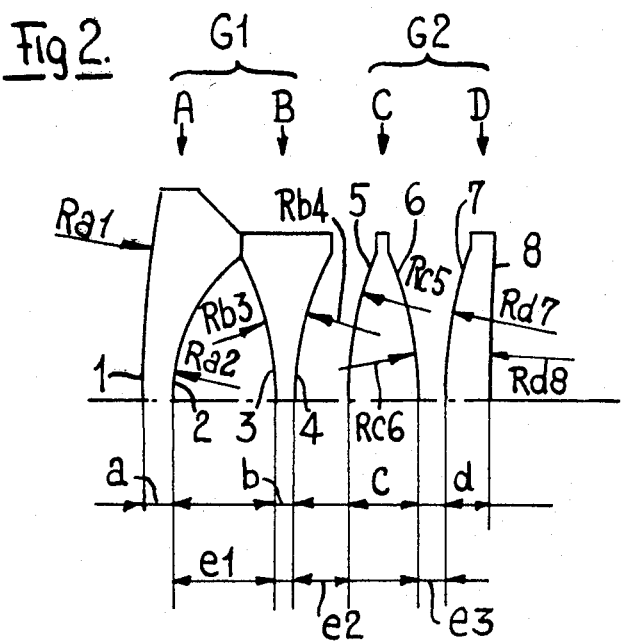

AFOCAL OPTICAL DEVICE

The main difficulties of the submarine photography are the imprecision of the framing, the focussing and the lack of contrast due to the diffusion of the particles in suspension and to law lighting.

The use of a super-wide-angle objective as on certain cameras generally enables to overcome these difficulties, permitting to take pictures quickly without sighting due to the very great field depth which also permits to set an average distance. The effect of the particles in suspension is also considerably reduced and the lighting obtained by means of flashes is greatly enhanced due to the reduction of the distance at which pictures are taken for a same framing in comparison to the use of a normal objective.

The cameras provided with a super-wide-angle objective on the market are very expensive and often not equipped for submarine photography.

The invention provides an afocal front-objective easy to mount on cameras provided with normal objectives, in order to greatly increase the field.

This device forms a removable accessory adapted to be placed on the objective of a camera, as well in the air as in water, in order to reduce the focal length without modifying the focussing.

The attached drawing shows by way of example two embodiments of the device according to the invention.

FIG. 1 is a schematic axial cross-section of the first embodiment.

FIG. 2 is a schematical representation of the optics of the two embodiments.

The device shown in FIG. 1 comprises a tubular housing 11 having at its rear end a skirt 12 defining an annular groove 13 permitting to assemble the device onto the end of a normal objective of a photographic camera or of a movie camera.

The optical assembly which is placed in the housing 1 comprises four lenses A, B, C, D made out of acrylic resin (Plexiglas).

The two diverging lenses A, B form a front diverging group G1 having a focal length F1, whereas the two converging lenses C and D form a positive rear group G2 having a focal length F2.

The lens A of the front group is a diverging meniscus whose face 1 having the greater radius of curvature is located forwardly in contact with the air or water. The second lens B of the front group is a negative equiconcave lens the radius of curvature Rb3 = Rb4 of which is greater than the smaller radius of curvature Ra2 of the meniscus A, on its rear face 2.

The front face 1 of the meniscus has a non spherical shape; it comprises in its center a circular area having a diameter Z and a radius of curvature Ra1, surrounded by two rings, of identical width L1 and L2 equal to Z/2, having radii of curvature smaller than Ra1, and less for the outer ring than for the inner ring. The amount of non sphericity is preferably such that the deviation with respect to the spherical radius is greater than 1% of the value of this radius of the outer diameter.

The front lens A is protected from shocks by an extension 14 of the housing 1 which also forms a sunscreen which presents four notches 15.

The rear lens D of the positive rear group G2 is a meniscus, whose face 8 of longer radius is located rearwardly, in contact with the air or water. The lens C, also of group G2, is an equi-convex lens located in front of lens D and radius of curvature Rc5-Rc6 is smaller than the radius of curvature Rd7 of the front face of the lens D.

The radius of curvature Rb4 of the rear face 4 of the second lens B of the front diverging group is smaller than the radius of curvature Rc5 of the front face 5 of the lens C of the positive rear group G2.

The following table gives in relation to FIG. 2 the values of the radius of curvature, thickness and spacings of the lenses, on the one hand, for this first embodiment given as Example I which comprises lenses in acrylic resin (Plexiglas) with the same refractive index $n_v = 1.4921$ for all the lenses, and on the other hand, for a second embodiment given as Example II comprising lenses made out of glass K5 having the same refractive index $n_v = 1.52249$ for all the lenses. The values are in millimeters.

|  | Example I Plexiglas $n_v = 1.4921$ | Example II Glass K5 $n_v = 1.52249$ |
|---|---|---|
| Ra1 | 177.00 | 187.90 |
| Ra2 | 28.29 | 30.04 |
| a | 17.00 | 17.00 |
| e1 | 5.00 | 5.00 |
| Rb3 | −49.35 | −52.40 |
| Rb4 | 49.35 | 52.40 |
| b | 3.00 | 3.00 |
| e2 | 8.45 | 7.82 |
| Rc5 | 60.54 | 64.20 |
| Rc6 | −60.54 | −64.20 |
| c | 13.30 | 11.30 |
| e3 | 5.00 | 5.00 |
| Rd7 | 68.80 | 69.54 |
| Rd8 | 556.80 | 621.10 |
| d | 7.00 | 7.00 |
| Focal length of G1: F1 = | −23.5085 F1 = | −23.5085 |
| Focal length of G2: F2 = | 60.3543 F2 = | 60.3543 |

The radius of curvature Rd8 of the rear face 8 of the rear meniscus D of the rear positive group G2 is linked to the value of the radius of curvature Ra1 of the lens 17 by a given relation which is a function of the characteristics of the different media. The solution of the linking equation gives the following condition which is satisfied for these devices:

$$(0.8) \times (n_v/n_e) \times |(F2/F1)| \times Ra1 < Rd8 < (1.25) \times (n'_v/n_e) \times |(F2/F1)| \times Ra1 \quad (I)$$

where:
  $n_v$ is the refractive index of the material of the front meniscus A
  $n'_v$ is the refractive index of the material of the rear lens D
  $n_e$ is the refractive index of water
  F1 is the focal length of the front diverging group G1
  F2 is the focal length of the positive rear group G2
and where the radii of curvature Rd8 and Ra1 have the same sign.

Thus for Example I, the formula (I) gives with the values of the table and a refractive index for water:

$n_e = 1.339$ giving $n_v/n_e \times n'_v/n_e = 1.11433906$ $(0.8) \times (1.11433906) \times |(60.3543/-23.5085)| \times (177) = 405.1015$ $(1.25) \times (1.11433906) \times |(60.3543/-23.5085)| \times (177) = 632.971$ that is: 405.10<556.8<632.971, fulfilling the given condition.

It is to be noted that the signs of the radii Rb4 and Rd8 are identical.

This is an essential condition in order that the focussing remains constant despite the change of the ambient medium.

One well known case is the one where the radius of curvature Ra1 and Rd8 of the extreme faces are infinite.

In a variant of Example I, comprising the same lenses A, B and C, the rear lens D may be a plano-convex lens the planar face 8 of which is located at the rear, in contact with the air or water, the radius of curvature of its convex face being: Rd7=74.76. As the radius Rd8 is infinite, the condition (I) presented is not rigorously fulfilled and the deviation between the focussing in air and the focussing in water remains relatively important, without however rending the device unusable. Is permits to take pictures close to the boat when coming out of water.

While the invention has been described in detail and with reference to specific embodiments thereof, it will be apparent to one skilled in the art that various changes and modifications can be made therein without departing from the spirit and scope thereof.

What I claim is:

1. Removable afocal optical device for a picture taking objective which can be used in the air as well as in water and comprising a frontal divergent group (G1) and a convergent rear group (G2) each formed of two lenses (A,B,C,D), the radius of curvature (Rd8) of the rear face of the rear lens (D) of the rear group (G2) and the radius of curvature (Ra1) of the front face of the front lens (A) of the front group (G1) being finite and having the same sign; these two radii of curvature (Ra1; Rd8) being related by the following relation:

$$(0.8) \times (n_v/n_e) \times |(F2/F1)| \times Ra1 < Rd8 < (1.25) \times (n'_v/n_e) \times |(F2/F1)| \times Ra1$$

in which:
  $n_v$ is the refractive index of the material of the front lens A $n'_v$ is the refractive index of the material of the rear lens D $n_e$ is the refractive index of water
  F1 is the focal length of the front diverging group G1
  F2 is the focal length of the rear group G2
whereby the object field of the assembly comprising the objective with said device attached is greater than that of the objective along and said assembly can be used either in the air or underwater without modifying its focussing.

2. Device according to claim 1, in which the front lens of the frontal group (G1) is a diverging meniscus (A) the face (1) of which, having the greater radius of curvature, is located in front, in contact with the air or the water; the rear lens (B) of this frontal group (G1) being negative and equiconcave, the value of its radii of curvature (Rb3=Rb4) being greater than the smaller radius of curvature (Ra2) of the meniscus (A); the rear lens of the rear group (G2) being a meniscus (D) the rear face (8) of which, in contact with the air of the water has a greater radius of curvature (Rd8) than its forward face (7), and the front lens of this rear group being an equiconvex lens (C) the radii of curvature (Rc5=Rc6) of which are smaller than the radius of curvature (Rd7) of the front face of the latter meniscus (D).

3. Device according to claim 2, in which the radius of curvature (Rd4) of the rear face (4) of the rear lens (B) of the frontal group (G1) is smaller than the radius of curvature (Rc5) of the front face (5) of the front lens (C) of the rear group (G2).

4. Device according to claim 3, in which the front face (1), in contact with the air or the water, of the front lens (A) of the front group (G1) is an aspherical surface, the amount of asphericity of which is such that the difference between the radius of curvature at the center and the radius of curvature at the edge is greater than 1% of this latter radius of curvature.

* * * * *